(12) United States Patent
Maeda et al.

(10) Patent No.: US 12,155,042 B2
(45) Date of Patent: Nov. 26, 2024

(54) PRODUCING METHOD OF POWER STORAGE DEVICE

(71) Applicant: Prime Planet Energy & Solutions, Inc., Tokyo (JP)

(72) Inventors: Atsushi Maeda, Toyota (JP); Naoki Masuzawa, Toyota (JP); Kengo Yasueda, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 294 days.

(21) Appl. No.: 17/853,879

(22) Filed: Jun. 29, 2022

(65) Prior Publication Data
US 2023/0096550 A1 Mar. 30, 2023

(30) Foreign Application Priority Data
Sep. 29, 2021 (JP) .................. 2021-159248

(51) Int. Cl.
*B29C 43/24* (2006.01)
*B29C 55/06* (2006.01)
(Continued)

(52) U.S. Cl.
CPC ......... *H01M 10/0587* (2013.01); *B29C 43/24* (2013.01); *B29C 55/065* (2013.01); *H01M 4/0435* (2013.01); *B29L 2031/3468* (2013.01)

(58) Field of Classification Search
CPC ....... B29C 43/24; B29C 43/28; B29C 43/305; B29C 43/46; B29C 55/02; B29C 55/023; B29C 55/04; B29C 55/06; B29C 55/065; B29L 2031/3468; B32B 2457/10; H01M 4/04; H01M 4/043; H01M 4/0435; H01M 4/139; H01M 10/0431; H01M 10/0525; H01M 10/058; H01M 10/0583; H01M 10/0585; H01M 10/0587; Y02E 60/10; Y02P 70/50
See application file for complete search history.

(56) References Cited

U.S. PATENT DOCUMENTS

2004/0107564 A1* 6/2004 Kurimoto ......... H01M 10/0409
29/730
2018/0226630 A1 8/2018 Yanai et al.

FOREIGN PATENT DOCUMENTS

JP 2014116141 A * 6/2014
JP 2017228349 A 12/2017
(Continued)

*Primary Examiner* — Michael A Tolin
(74) *Attorney, Agent, or Firm* — HAUPTMAN HAM, LLP

(57) ABSTRACT

A producing method of a power storage device includes roll pressing a mixture laminated portion of a wide strip-shaped electrode plate, non-laminated-portion stretching of stretching a pair of mixture non-laminated portions of the wide strip-shaped electrode plate in a longitudinal direction, laminated-portion stretching of stretching a pair of mixture non-laminated-portion-side sections of the mixture laminated portion located on the mixture non-laminated portion side, cutting the wide strip-shaped electrode plate at a center of a width direction in the longitudinal direction to divide into two strip-shaped electrode plates, winding up the two strip-shaped electrode plates around winding cores with applying tensile force in the longitudinal direction in a roll-like shape to form electrode rolls, and storing each of the electrode rolls.

4 Claims, 14 Drawing Sheets

(51) Int. Cl.
*B29L 31/34* (2006.01)
*H01M 4/04* (2006.01)
*H01M 10/0587* (2010.01)

(56) References Cited

FOREIGN PATENT DOCUMENTS

| | | | |
|---|---|---|---|
| JP | 2018106813 A | | 7/2018 |
| JP | 202077466 A | | 5/2020 |
| JP | 202195238 A | | 6/2021 |
| JP | 2021095238 A | * | 6/2021 |
| JP | 2021163688 A | * | 10/2021 |

* cited by examiner

PRODUCING METHOD OF POWER STORAGE DEVICE

CROSS-REFERENCE TO RELATED APPLICATIONS

This application is based upon and claims the benefit of priority from the prior Japanese Patent Application No. 2021-159248, filed Sep. 29, 2021, the entire contents of which are incorporated herein by reference.

BACKGROUND

Technical Field

The present disclosure relates to a producing method of a power storage device.

Related Art

JP2017-228349A discloses a producing method of a lithium-ion secondary battery as a power storage device. Specifically, there is provided a non-laminated-portion stretching step of longitudinally stretching a pair of mixture non-laminated portions of an electrode sheet (hereinafter, also referred as a wide strip-shaped electrode plate) that includes a strip-shaped mixture laminated portion in which an electrode mixture layer is laminated on a surface of a strip-shaped current collecting foil extending in the longitudinal direction, and a pair of strip-shaped mixture non-laminated portions of the current collecting foil having no lamination of the electrode mixture layer and extending in the longitudinal direction on both widthwise sides orthogonal to the longitudinal direction of the mixture laminated layer. Thereafter, in a roll pressing step, for the wide strip-shaped electrode plate that has been performed with the non-laminated-portion stretching step, a mixture laminated portion is roll-pressed. In this producing method, a longitudinal elongation rate of the mixture non-laminated portion in the non-laminated-portion stretching step and a longitudinal elongation rate of the mixture laminated portion stretched in the roll pressing step are made to be similar so that generation of wrinkles and curves on the wide strip-shaped electrode plate is reduced.

SUMMARY

Technical Problems

The wide strip-shaped electrode plate, which has been finished with the above-mentioned non-laminated-portion stretching step and the roll pressing step, is then cut in the longitudinal direction at a center position of the widthwise direction in a cutting step to divide the wide strip-shaped electrode plates into two strip-shaped electrode plates, for example. Subsequently, in a winding-up step, the two strip-shaped electrode plates are wound up in a roll-like shape around winding cores with applying a tensile force in the longitudinal direction to form two electrode rolls. Subsequently, in a storing step, the electrode rolls are each stored. Further subsequently, in an electrode body producing step, the strip-shaped electrode plates constituting the electrode rolls that have been processed with the storing step are each cut by a predetermined length to produce a plurality of the electrode plates. By these electrode plates, a power storage device such as a lithium-ion secondary battery is produced.

Herein, a thickness of the electrode mixture layer of the wide strip-shaped electrode plate is thick in a widthwise center portion and thin in both widthwise side portions (mixture non-laminated-portion-side sections). Accordingly, in the two strip-shaped electrode plates produced by cutting the wide strip-shaped electrode plate along the longitudinal direction at the widthwise center in the cutting step, a cut-plane-side section of the mixture laminated portion is thick and the mixture non-laminated-portion-side section of the mixture laminated portion is thin. The strip-shaped electrode plates with this configuration are each wound up around the winding core in a roll-like shape with applying the tensile force in the longitudinal direction in the winding-up step to form the two electrode rolls, and then these electrode rolls are stored in the storing step. As a result of storing, the cut-plane-side section having the thick thickness of the mixture laminated portion is applied with a relatively strong tensile force. This leads to stretching of the cut-plane-side section of the mixture laminated portion during storage, so that the mixture non-laminated-portion-side section becomes relatively short in the mixture laminated portion. This gap in the length of the cut-plane-side section and the mixture non-laminated-portion-side section of the mixture laminated portion sometimes causes a widthwise curve in the strip-shaped electrode plate.

The present disclosure has been made in view of the above circumstances and has a purpose of providing a producing method of a power storage device which can achieve reduction in a curve in a widthwise direction for a strip-shaped electrode plate which has been processed with a storing step.

Means of Solving the Problems

One aspect of the present disclosure provides a producing method of a power storage device including: roll pressing a mixture laminated portion of a wide strip-shaped electrode plate which includes the mixture laminated portion of a strip shape in which an electrode mixture layer is laminated on a surface of a strip-shaped current collecting foil extending in a longitudinal direction and a pair of mixture non-laminated portions of the current collecting foil in which no electrode mixture layer is laminated, the mixture non-laminated portions extending in the longitudinal direction on both sides of the mixture laminated portion in a width direction orthogonal to the longitudinal direction, non-laminated-portion stretching of stretching the pair of the mixture non-laminated portions of the wide strip-shaped electrode plate in the longitudinal direction, and laminated-portion stretching of stretching a pair of mixture non-laminated-portion-side sections of the mixture laminated portion placed on sides close to the mixture non-laminated portion, wherein the roll pressing, the non-laminated portion extending, and the laminated portion extending are allowed to be performed in any order, the producing method includes: cutting the wide strip-shaped electrode plate, which has been finished with the roll pressing, the non-laminated-portion extending, and the laminated-portion extending, in the longitudinal direction at a center in the width direction to divide the wide strip-shaped electrode plate into two strip-shaped electrode plates, winding up each of the two strip-shaped electrode plates in a roll-like shape around a winding core with applying a tensile force in the longitudinal direction to form two electrode rolls, storing each of the two electrode rolls, and electrode plate producing of cutting the strip-shaped electrode plates configuring the electrode rolls, which have been through with the storing, by a predetermined length to produce a plurality of electrode plates.

By the roll pressing, the mixture laminated portion in which the electrode mixture layer exists in the wide strip-shaped electrode plate is rolled in the longitudinal direction, but the mixture non-laminated portion which has no electrode mixture layer is not rolled in the longitudinal direction, and thus the mixture non-laminated portion becomes relatively short. This gap in the length of the mixture laminated portion and the length of the mixture non-laminated portion could cause the widthwise curve in the strip-shaped electrode plate that has been formed by dividing the wide strip-shaped electrode plate into two.

To address this, in the above-mentioned producing method, the non-laminated-portion stretching is performed to stretch a pair of the mixture non-laminated portions of the wide strip-shaped electrode plate in the longitudinal direction. Thus, in addition to the mixture laminated portion stretched in the longitudinal direction in the roll pressing, the pair of the mixture non-laminated portions can also be stretched in the longitudinal direction. This stretching results in extension or stretch of the wide strip-shaped electrode plate (the current collecting foil) in the longitudinal direction over the entire widthwise direction, achieving reduction in the widthwise curve that is generated in the strip-shaped electrode plate after the cutting.

Further, as mentioned above, the strip-shaped electrode plate formed by cutting the wide strip-shaped electrode plate in the cutting has a thick thickness in the cut-plane-side section and a thin thickness in the mixture non-laminated-portion-side section of the mixture laminated portion. When the electrode roll formed by winding up the thus configured strip-shaped electrode plate in a roll-like shape is stored in the storing, the electrode roll is stored with applying a relatively strong tensile force to the thick cut-plane-side section of the mixture laminated portion, so that the cut-plane-side section of the mixture laminated portion is being stretched during storage. As a result of this, in the conventional producing method, the mixture non-laminated-portion-side section becomes relatively short in the mixture laminated portion, and a gap in the length of the cut-plane-side section and the mixture non-laminated-portion-side section of the mixture laminated portion could cause the widthwise curve in the strip-shaped electrode plate that has been performed with the storing.

To address this, in the laminated-portion stretching prior to the cutting of the above-mentioned producing method, the pair of the mixture non-laminated-portion-side sections of the mixture laminated portion located on sides close to the mixture non-laminated portion (both widthwise sides) are stretched in the longitudinal direction. Of the mixture laminated portion, not only the cut-plane-side section (a portion of the mixture laminated portion located on a cut plane side formed by a cutting operation in the cutting) which is to be stretched in the longitudinal direction in the following storing but also the mixture non-laminated-portion-side section are stretched in the longitudinal direction in advance, so that the gap in the length of the cut-plane-side section and the mixture non-laminated-portion-side section can be made small in the strip-shaped electrode plate after the storing. Therefore, the strip-shaped electrode plate that has been performed with the storing can achieve reduction in the widthwise curve. Moreover, in the above-mentioned producing method, the electrode plate can be produced from the strip-shaped electrode plate having the small widthwise curve in the electrode plate producing, and thus the electrode plate can be appropriately produced.

Further, in the above-mentioned producing method, three processes of the roll pressing, the non-laminated-portion stretching, and the laminated-portion stretching may be performed in any order, but it is favorable to perform the roll pressing first. Furthermore, the non-laminated-portion stretching and the laminated-portion stretching may be performed simultaneously. Specifically, the mixture non-laminated portion and the mixture non-laminated-portion-side section of the mixture laminated portion may be stretched at the same time. As a power storage device, there are given examples of a secondary battery such as a lithium-ion secondary battery and a capacitor such as an electric double-layer capacitor and a lithium-ion capacitor.

Further, in the above-mentioned producing method of a power storage device, preferably, the laminated-portion stretching is performed to stretch the pair of the mixture non-laminated-portion-side sections in the longitudinal direction such that a stretched amount of a portion of the mixture non-laminated-portion-side section of the mixture laminated portion to be located on an outer circumferential side of the electrode roll is larger than a stretched amount of a portion to be located on an inner circumferential side of the electrode roll.

As mentioned above, when the electrode roll is stored in the process of the storing, the cut-plane-side section of the mixture laminated portion is stretched in a manner that the stretched length becomes larger in the portion located on the outer circumferential side than in the portion located on the inner circumferential side of the electrode roll. This is because the outer circumferential side of the electrode roll is increased its external diameter gap between the cut-plane-side section and the mixture non-laminated-portion-side section due to a thickness gap of the cut-plane-side section and the mixture non-laminated-portion-side section of the mixture laminated portion, and thus it is conceived that the tensile force applied to the cut-plane-side section is increased on the outer circumferential side of the electrode roll.

To address this, in the laminated-portion stretching of the above-mentioned producing method, the pair of the mixture non-laminated-portion-side sections are stretched in the longitudinal direction such that the stretched length of the mixture non-laminated-portion-side section of the mixture laminated portion in the portion located on the outer circumferential side is larger than in the portion located on the inner circumferential side of the electrode roll that is to be formed in the later process of the winding up. To be more specific, for example, the pair of the mixture non-laminated-portion-side sections are stretched in the longitudinal direction in the process of the laminated-portion stretching such that a stretched length on a longitudinal rear-end-side portion which is to be stretched later becomes larger than a stretched length on a leading-end-side portion which is to be stretched earlier in the process of the laminated-portion stretching.

As mentioned above, the stretched length of the mixture non-laminated-portion-side section stretched in the laminated-portion stretching is made to be larger in the portion to be located on the outer circumferential side than in the portion to be located on the inner circumferential side of the electrode roll as similar to the cut-plane-side section after the storing, so that the stretch gap of the cut-plane-side section and the mixture non-laminated-portion-side section after storage can be made small over the entire longitudinal direction. Therefore, the widthwise curve of the strip-shaped electrode plate after the storing can be further reduced.

Further, in the above-mentioned producing method of the power storage device, preferably, the non-laminated-portion stretching is to stretch the pair of the mixture non-laminated portions in the longitudinal direction such that a stretched amount of a portion to be located on an outer circumferential side of the electrode roll of the mixture non-laminated portion is larger than a stretched amount of a portion to be located on an inner circumferential side.

As mentioned above, when the electrode roll is stored in the storing, the cut-plane-side section of the mixture laminated portion is stretched in a manner that the stretched amount becomes larger in the portion placed on the outer circumferential side than in the portion placed on the inner circumferential side of the electrode roll.

To address this, in the non-laminated-portion stretching of the above-mentioned producing method, the pair of the mixture non-laminated portions are stretched in the longitudinal direction such that the stretched amount of the portion to be located on the outer circumferential side of the electrode roll of the mixture non-laminated portion is larger than the stretched amount of the portion to be located on the inner circumferential side. To be specific, for example, the pair of the mixture non-laminated portions are stretched in the longitudinal direction such that a stretched amount of a longitudinal rear-end-side portion of the mixture non-laminated portion, which is to be stretched later, is larger than a stretched amount of a longitudinal leading-end-side portion which is stretched earlier in the non-laminated-portion stretching.

As mentioned above, the stretched amount of the mixture non-laminated portion in the non-laminated-portion stretching is, as similar to the cut-plane-side section of the mixture laminated portion after the storing, made to be larger in the portion to be located on the outer circumferential side than in the portion to be located on the inner circumferential side of the electrode roll. This leads to reduction in a stretch gap between the mixture non-laminated portion and the cut-plane-side section after the storing over the entire longitudinal direction, so that the widthwise curve of the strip-shaped electrode plate after the storing can be further reduced.

Further, in the above-mentioned producing method of the power storage device, preferably, the non-laminated-portion stretching is: to use a first stretching roll including a first minor diameter portion of a columnar shape extending in an axial direction and a pair of first major diameter portions each having a columnar shape and having a larger diameter than the first minor diameter portion on both axially outer sides with respect to the first minor diameter portion; to wind up the pair of the mixture non-laminated portions of the wide strip-shaped electrode plate around an outer circumferential surface of the pair of the first major diameter portions of the first stretching roll and apply a tensile force in the longitudinal direction to the pair of the mixture non-laminated portions to stretch the pair of the mixture non-laminated portions in the longitudinal direction, and the laminated-portion stretching is: to use a second stretching roll including a second minor diameter portion of a columnar shape extending in the axial direction and a pair of second major diameter portions each having a columnar shape and having a larger diameter than the second minor diameter portion on both axially outer sides with respect to the second minor diameter portion; to wind up the pair of the mixture non-laminated-portion-side sections located on the mixture non-laminated portion side of the mixture laminated portion on an outer circumferential surface of the pair of the second major diameter portions of the second stretching roll and apply the tensile force in the longitudinal direction to the pair of the mixture non-laminated-portion-side sections to stretch the pair of the mixture non-laminated-portion-side sections in the longitudinal direction.

In the above-mentioned producing method, the non-laminated-portion stretching and the laminated-portion stretching may be performed simultaneously by utilizing a single stretching roll incorporating the first stretching roll and the second stretching roll. In this case, for example, a stretching roll includes a minor diameter portion in which the first minor diameter portion and the second minor diameter portion are identical, a pair of second major diameter portions located on both axial sides of the minor diameter portion, around which the mixture non-laminated-portion-side section is to be wound, and a first major diameter portion located on an axially outer side with respect to the respective second major diameter portions around which the mixture non-laminated portion is to be wound.

DETAILED DESCRIPTION OF THE EXEMPLARY EMBODIMENTS

Embodiment

Figure 1:
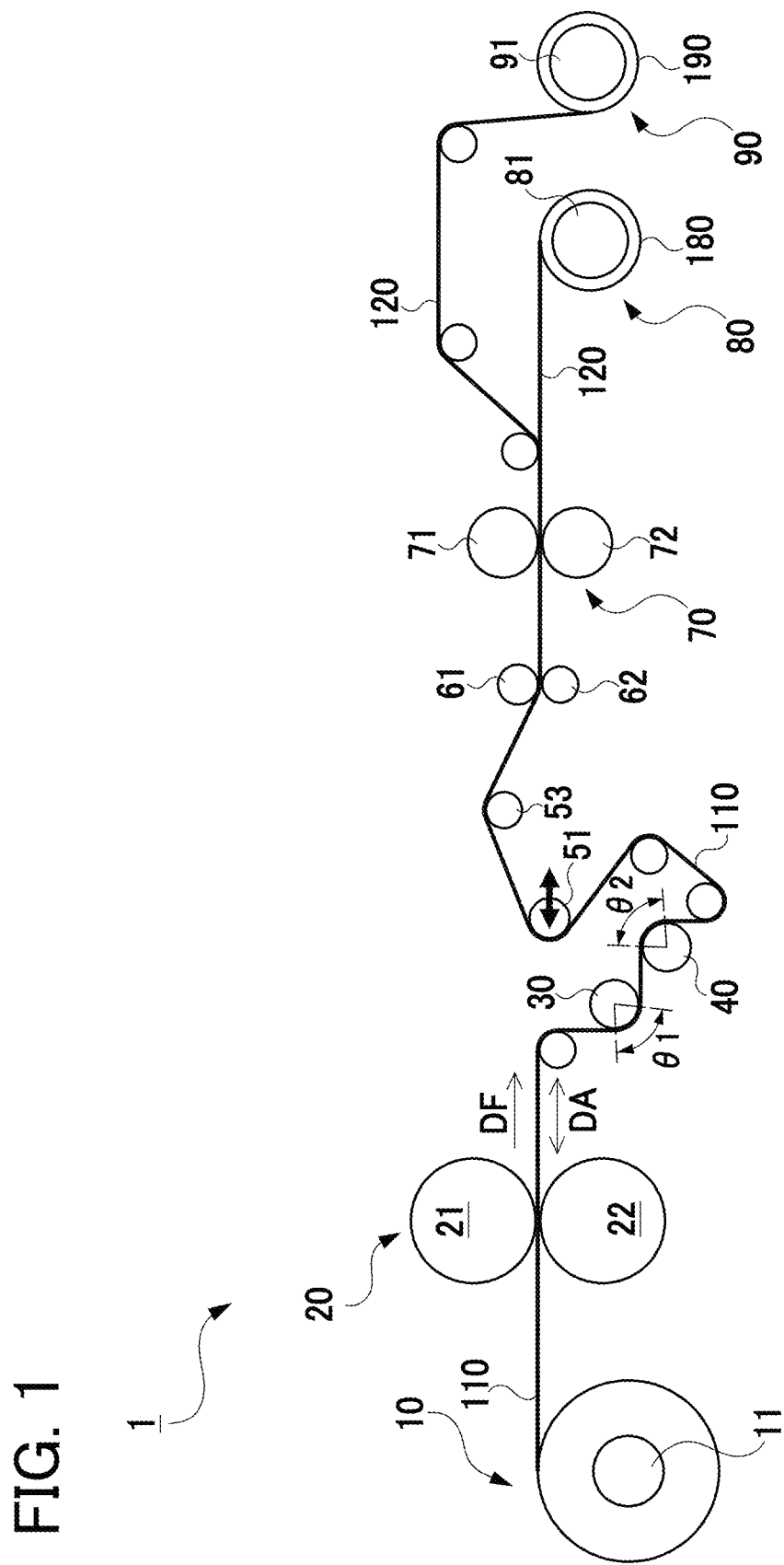
FIG. 1 is a schematic view of a producing apparatus of a strip-shaped electrode plate in an embodiment.

A producing method of a strip-shaped electrode plate and a power storage device according to an embodiment is explained. The present embodiment is explained with an example of producing a lithium-ion secondary battery 200 as the power storage device. FIG. 1 is a schematic view of a producing apparatus 1 of a strip-shaped electrode plate 120 according to the embodiment. The producing apparatus 1 is provided with a wind-off section 10, a roll press section 20, a first stretching roll 30, a second stretching roll 40, a dancer roll 51, a tensile-force detection part 53, nip rolls 61 and 62, a cutting section 70, a first wind-up section 80, and a second wind-up section 90, and these sections and components are arranged in this order in a feeding direction DF. Herein, this feeding direction DF represents a feeding direction of a wide strip-shaped electrode plate 110 and the strip-shaped electrode plate 120 and coincides with a longitudinal direction DA of the wide strip-shaped electrode plate 110 and the strip-shaped electrode plate 120.

Figure 2:
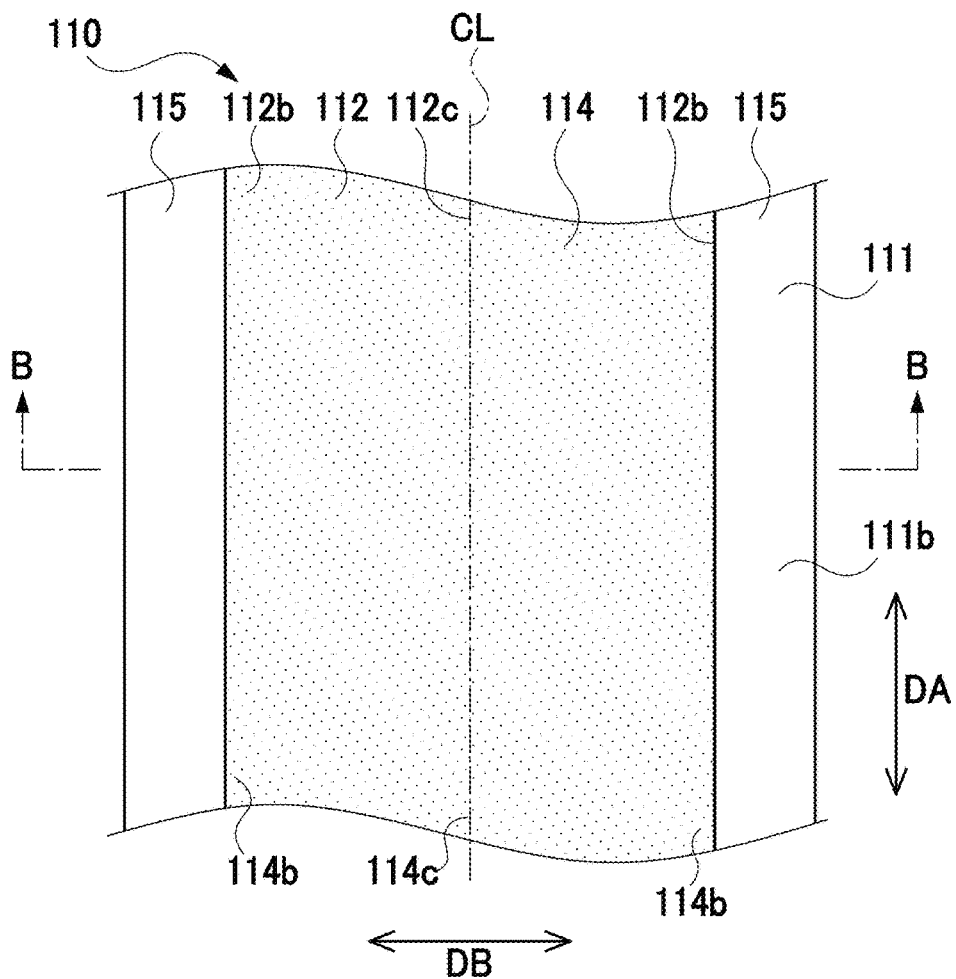
FIG. 2 is a plan view of a wide strip-shaped electrode plate in the embodiment.
Figure 3:
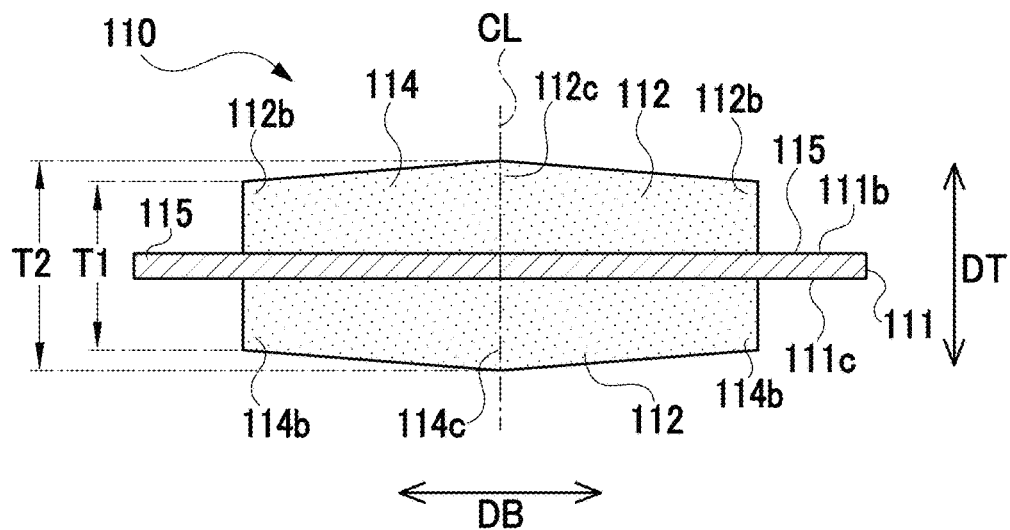
FIG. 3 is a sectional view taken along a line B-B in FIG. 2.

The wide strip-shaped electrode plate 110 includes a mixture laminated portion 114 of a strip shape and a pair of mixture non-laminated portions 115 of a strip shape as shown in FIG. 2 and FIG. 3. The mixture laminated portion 114 is a portion where electrode mixture layers 112 are each laminated on a first surface 111b and a second surface 111c of a strip-shaped current collecting foil 111 that extends in the longitudinal direction DA. The mixture non-laminated portions 115 are portions in which no electrode mixture layers 112 are laminated in the current collecting foil 111, and the mixture non-laminated portions 115 are adjacent to both sides of the mixture laminated portion 114 in a widthwise direction DB orthogonal to the longitudinal direction DA to extend in the longitudinal direction DA.

Figure 4:
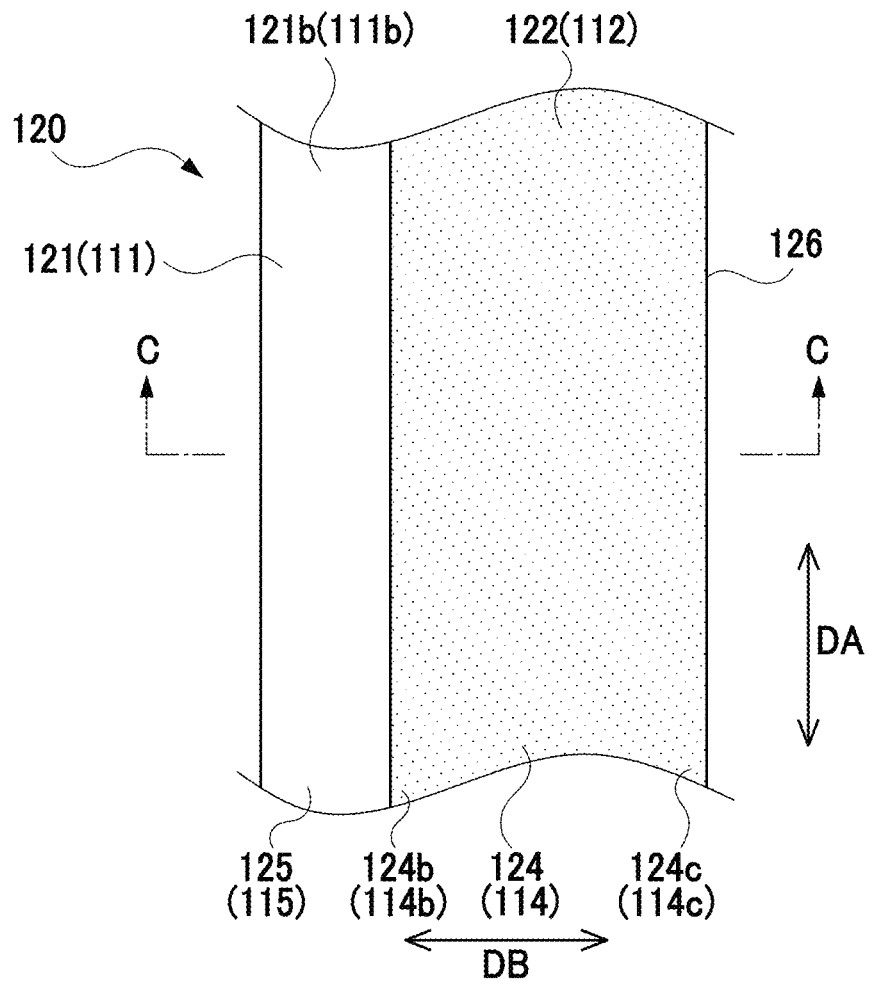
FIG. 4 is a plan view of the strip-shaped electrode plate in the embodiment.
Figure 5:
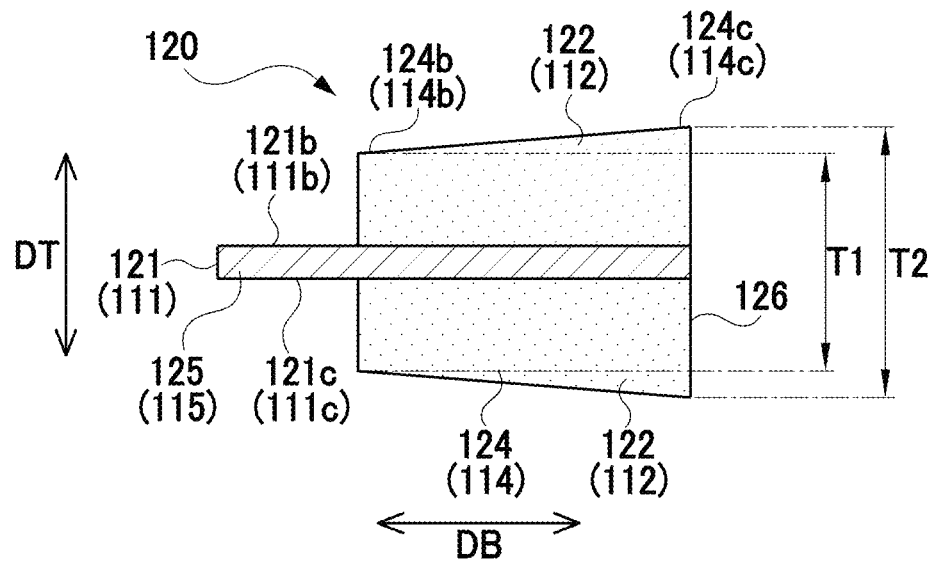
FIG. 5 is a sectional view taken along a line C-C in FIG. 4.

Further, the strip-shaped electrode plate 120 is formed by cutting and dividing the wide strip-shaped electrode plate 110 in the longitudinal direction DA at a center CL of the widthwise direction DB. Specifically, as shown in FIG. 4 and FIG. 5, the strip-shaped electrode plate 120 includes a mixture laminated portion 124 of a strip shape and a mixture non-laminated portion 125 of a strip shape. The mixture laminated portion 124 is a portion in which electrode mixture layers 122 are each laminated on a first surface 121b and a second surface 121c of a strip-shaped current collecting foil 121 extending in the longitudinal direction DA. The mixture non-laminated portion 125 is a portion in which no electrode mixture layers 122 are laminated in the current collecting foil 121, and the mixture non-laminated portion 125 is adjacent to the mixture laminated portion 124 in the widthwise direction DB orthogonal to the longitudinal direction DA to extend in the longitudinal direction DA.

Herein, a thickness of the electrode mixture layer 112 of the wide strip-shaped electrode plate 110 is thick in a center portion 112c and thin in both side portions (mixture-non-laminated-portion-side sections 112b) in the widthwise direction DB (see FIG. 3). Accordingly, the mixture laminated portion 114 of the wide strip-shaped electrode plate 110 has a thickness T2 of a center portion 114c in the widthwise direction DB and this thickness T2 is larger than a thickness T1 of the both side portions (the mixture-non-laminated-portion-side sections 114b). Therefore, in the strip-shaped electrode plate 120 formed by cutting and dividing the wide strip-shaped electrode plate 110 in the longitudinal direction DA at the center CL of the widthwise direction DB, the thickness T2 of a cut-plane-side section 124c of the mixture laminated portion 124 is larger than the thickness T1 of a mixture non-laminated-portion-side section 124b (see FIG. 5). Herein, the mixture non-laminated-portion-side section 124b is a portion of the mixture laminated portion 124 located on a side of the mixture non-laminated portion 125. Further, the cut-plane-side section 124c is a portion of the mixture laminated portion 124 located on a side of a cut plane 126 formed by cutting the wide strip-shaped electrode plate 110. In the present embodiment, a gap between the thickness T1 and the thickness T2 is about 1 μm.

Figure 7:
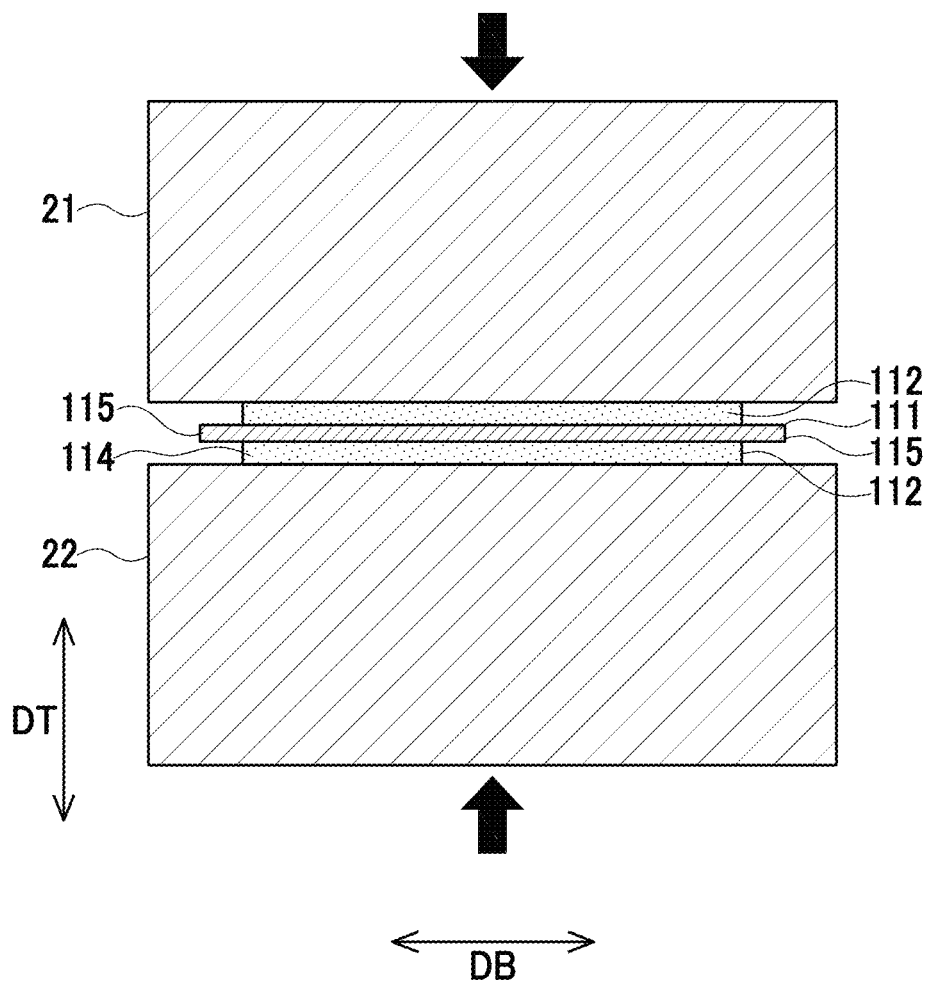
FIG. 7 is an explanatory view of a process of roll pressing in the embodiment.
Figure 8:
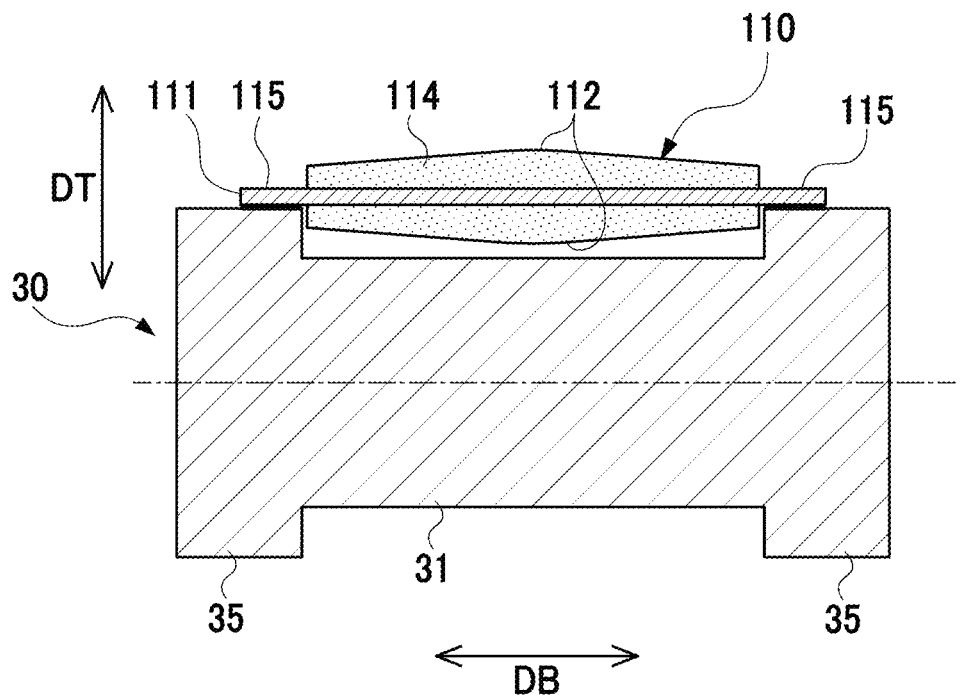
FIG. 8 is an explanatory view of a process of non-laminated-portion stretching in the embodiment.

The producing apparatus 1 is now explained in detail. The wind-off section 10 includes the wind-off roll 11 to feed the wide strip-shaped electrode plate 110. Further, the roll press section 20 is provided with the press rolls 21 and 22 to roll press the mixture laminated portion 114 of the wide strip-shaped electrode plate 110 (see FIG. 7). The first stretching roll 30 includes a first minor diameter portion 31 of a columnar shape extending in an axial direction which coincides with the widthwise direction DB and a pair of first major diameter portions 35 each having a columnar shape and a wider diameter than the first minor diameter portion 31 on both axially outer sides of the first minor diameter portion 31 to stretch the pair of the mixture non-laminated portions 115 of the wide strip-shaped electrode plate 110 in the longitudinal direction DA (see FIG. 8). The second stretching roll 40 includes a second minor diameter portion 41 of a columnar shape extending in the axial direction which coincides with the widthwise direction DB and a pair of second major diameter portions 45 each having a columnar shape and a larger diameter than the second minor diameter portion 41 on both axially outer sides of the second minor diameter portion 41 to stretch the pair of the mixture non-laminated-portion-side sections 114b of the mixture laminated portion 114 in the longitudinal direction DA (see FIG. 9).

The dancer roll 51 is provided in a movable manner to move in a left and right direction in FIG. 1 by stretching and contracting a not-shown air cylinder. The tensile-force detection part 53 is to detect a tensile force applied to the wide strip-shaped electrode plate 110 located between the press rolls 21, 22 and the nip rolls 61, 62. The cutting section 70 includes cutting blades 71 and 72 of a disc-like shape to cut the wide strip-shaped electrode plate 110 in the longitudinal direction DA at the center CL of the widthwise direction DB and divide the plate 110 into the two strip-shaped electrode plates 120. The first wind-up section 80 includes a winding core 81 to wind up one of the strip-shaped electrode plates 120 around the winding core 81 in a roll-like shape with applying the tensile force in the longitudinal direction DA to form an electrode roll 180. The second wind-up section 90 includes a winding core 91 to wind up the other strip-shaped electrode plate 120 around the winding core 91 in a roll-like shape with applying the tensile force in the longitudinal direction DA to form an electrode roll 190.

Figure 6:
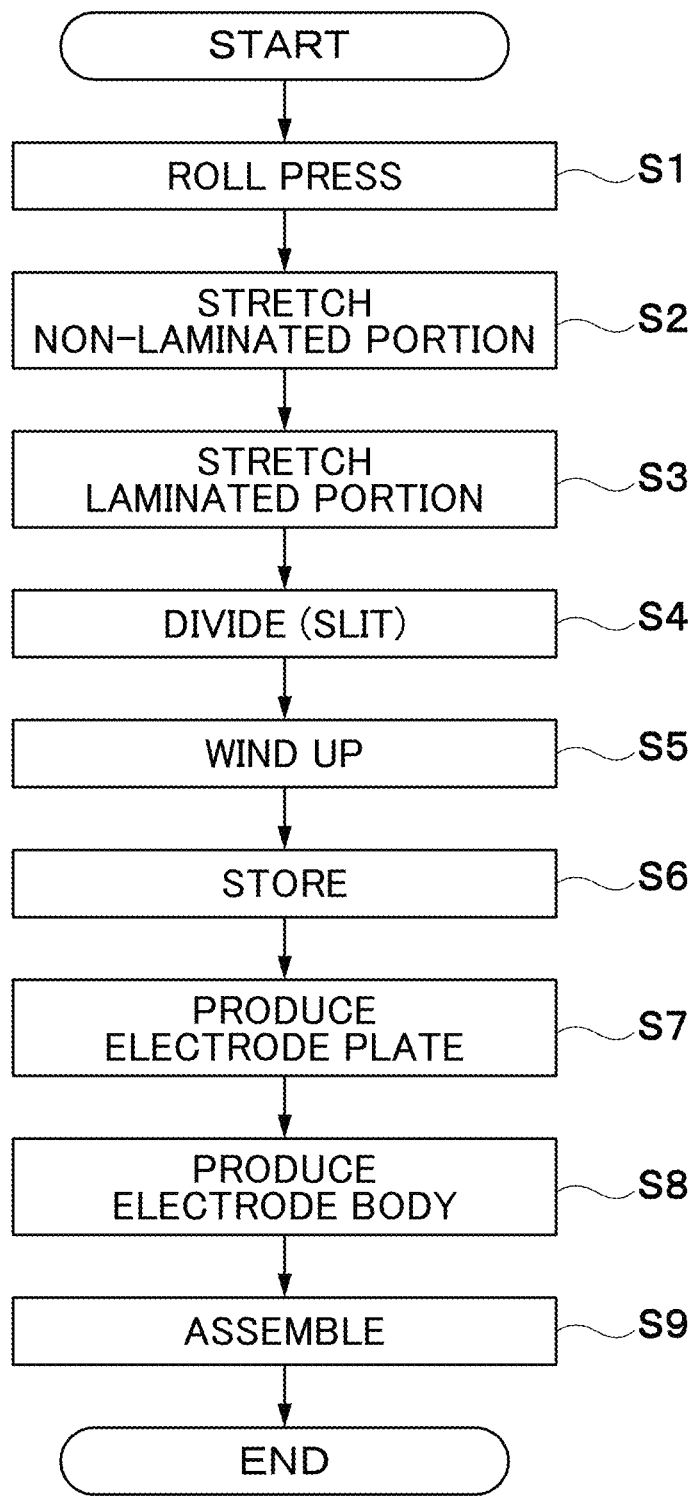
FIG. 6 is a flowchart indicating a flow of the producing method of a power storage device in the embodiment.

Next, a producing method of the lithium-ion secondary battery 200 of the present embodiment is explained in detail. In the present embodiment, firstly, the wide strip-shaped electrode plate 110 or the strip-shaped electrode plate 120 which is being fed in the feeding direction DF coinciding with the longitudinal direction DA is performed with steps S1 to S5 shown in FIG. 6 in this order by the producing apparatus 1. Specifically, in step S1 (a roll pressing step), the mixture laminated portion 114 of the wide strip-shaped electrode plate 110 is roll pressed by the pair of the press rolls 21 and 22 (see FIG. 1 and FIG. 7). By this step, the electrode mixture layer 112 is compressed in a thickness direction DT and the mixture laminated portion 114 is rolled in the longitudinal direction DA.

Subsequently, the process proceeds to step S2 (a non-laminated-portion stretching step) and the pair of the mixture non-laminated portions 115 of the wide strip-shaped electrode plate 110 are stretched in the longitudinal direction DA by use of the first stretching roll 30 (see FIG. 1 and FIG.

8). Specifically, the pair of the mixture non-laminated portions 115 of the wide strip-shaped electrode plate 110 are wound around outer circumferential surfaces of the pair of the first major diameter portions 35 of the first stretching roll 30 at a wrap angle θ1, and the mixture non-laminated portions 115 are applied or concentrated with the tensile force in the longitudinal direction DA so that the pair of the mixture non-laminated portions 115 are stretched in the longitudinal direction DA. Thus, in addition to the mixture laminated portion 114 that has been stretched in the longitudinal direction DA in the roll pressing step, the pair of the mixture non-laminated portions 115 are also stretched in the longitudinal direction DA. This results in stretching of the wide strip-shaped electrode plate 110 (the current collecting foil 111) in the longitudinal direction DA over the entire widthwise direction DB, achieving reduction in the curve in the widthwise direction DB that would be generated on the strip-shaped electrode plate 120 after a cutting step explained below.

Figure 9:
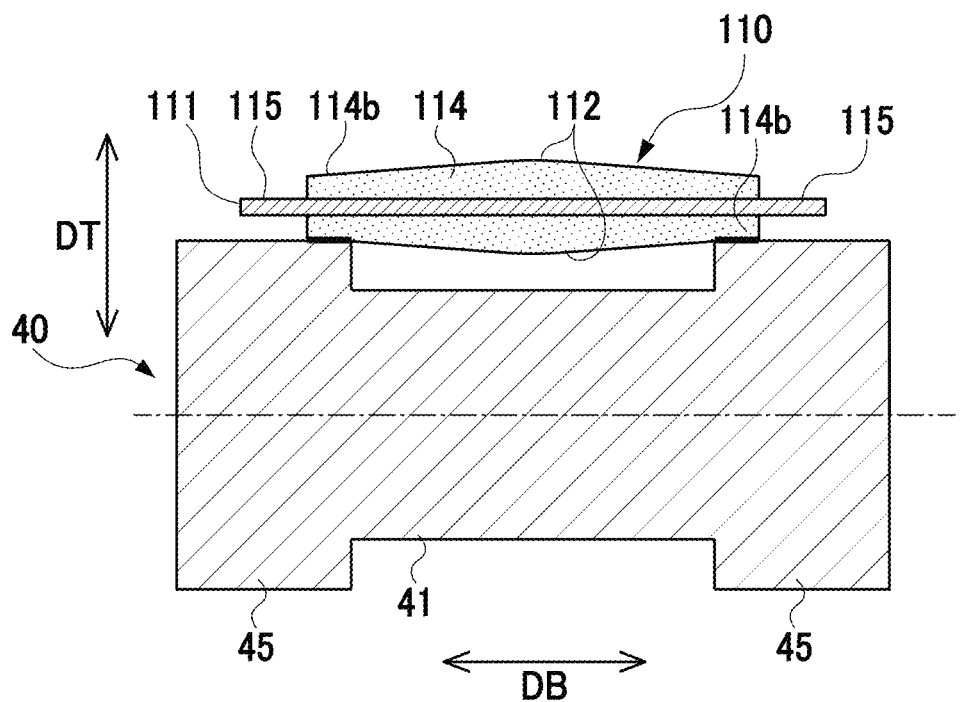
FIG. 9 is an explanatory view of a process of laminated-portion stretching in the embodiment.

Subsequently, the process proceeds to step S3 (a laminated-portion stretching step) and the second stretching roll 40 is used to stretch the pair of the mixture non-laminated-portion-side sections 114b in the longitudinal direction DA on sides (both outer sides in the widthwise direction DB) of the mixture laminated portion 114 located close to the mixture non-laminated portions 115 (see FIG. 1 and FIG. 9). Specifically, the pair of the mixture non-laminated-portion-side sections 114b of the mixture laminated portion 114 are wound around each outer circumferential surface of the pair of the second major diameter portions 45 of the second stretching roll 40 at a wrap angle θ2 and the tensile force is applied and concentrated on the mixture non-laminated-portion-side sections 114b in the longitudinal direction DA to stretch the pair of the mixture non-laminated-portion-side sections 114b in the longitudinal direction DA.

Subsequently, the process proceeds to step S4 (a cutting step), and the wide strip-shaped electrode plate 110 is cut in the longitudinal direction DA at the center CL of the widthwise direction DB by the cutting blades 71 and 71 to divide the plate 110 into the two strip-shaped electrode plates 120. Subsequently, the process proceeds to step S5 (a winding-up step), and one of the two strip-shaped electrode plates 120 is wound around the winding core 81 in a roll-like shape with applying the tensile force in the longitudinal direction DA to form the electrode roll 180, and the other strip-shaped electrode plate 120 is wound around the winding core 91 in a roll-like shape with applying the tensile force in the longitudinal direction DA to form the electrode roll 190.

Figure 11:
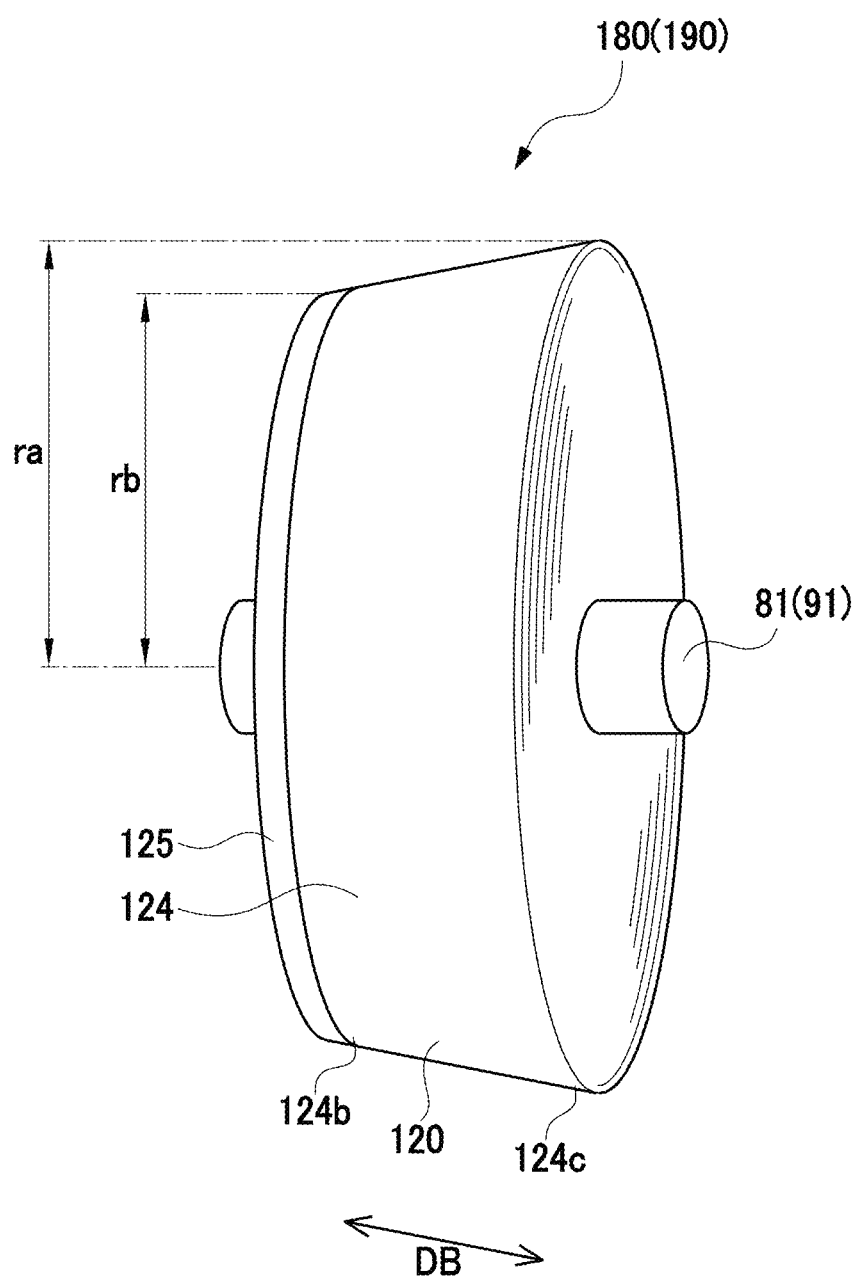
FIG. 11 is an explanatory view of a process of storing in the embodiment.
Figure 12:
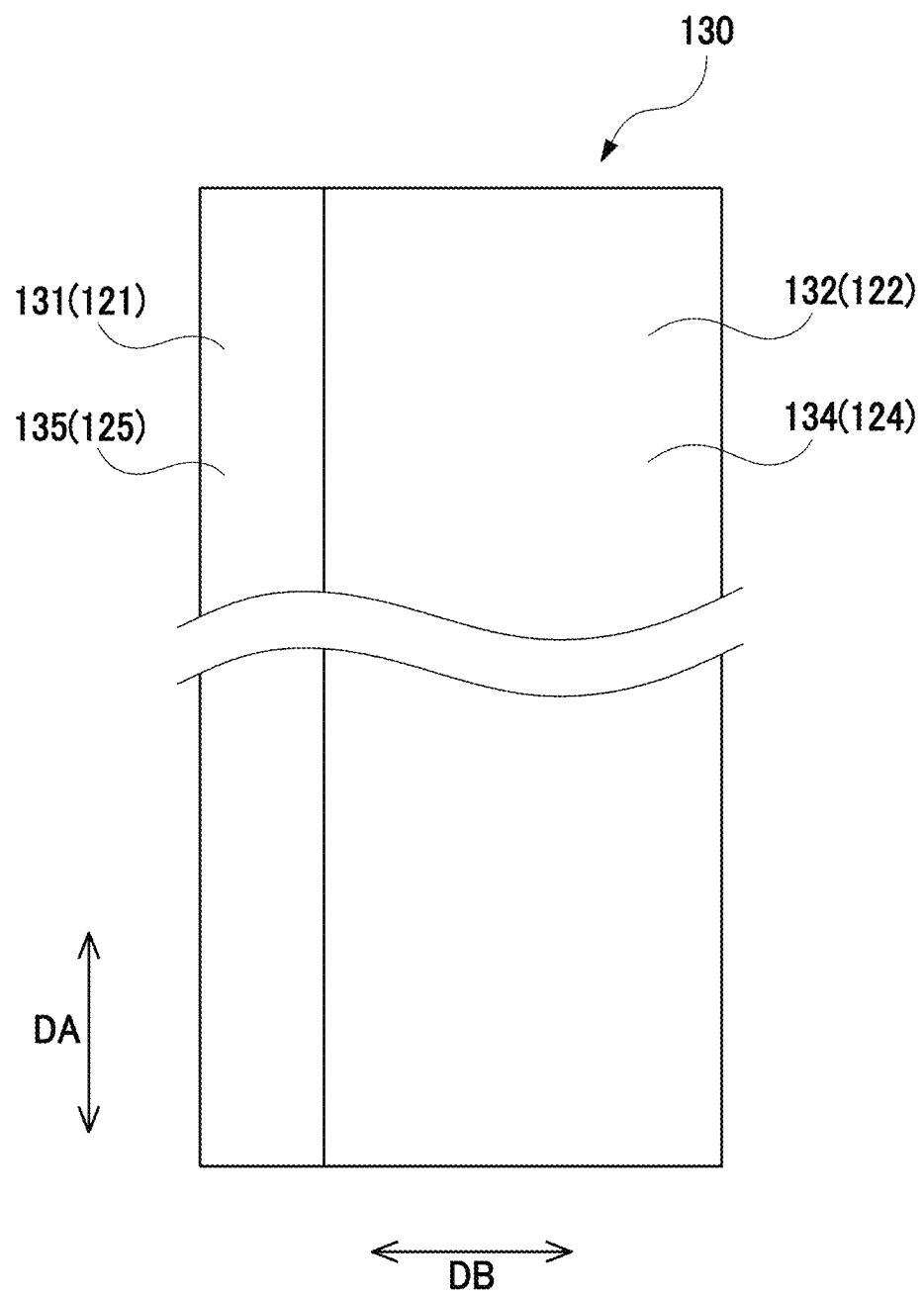
FIG. 12 is a plan view of an electrode plate in the embodiment.

Subsequently, in step S6 (a storing step), the electrode rolls 180 and 190 are stored (see FIG. 11). After that, the process proceeds to step S7 (an electrode plate producing step), and the strip-shaped electrode plates 120 configuring the electrode rolls 180 and 190 that have been through the storing step are each cut by a predetermined length to produce a plurality of electrode plates 130 (see FIG. 12). The electrode plate 130 includes a mixture laminated portion 134 and a mixture non-laminated portion 135. The mixture laminated portion 134 of this electrode plate 130 is a portion in which an electrode mixture layer 132 is laminated on surfaces (both faces) of a current collecting foil 131 extending in the longitudinal direction DA. The mixture non-laminated portion 135 is a portion of the current collecting foil 131 extending in the longitudinal direction DA adjacent to the mixture laminated portion 134 in the widthwise direction DB with no lamination of the electrode mixture layer 132.

Figure 13:
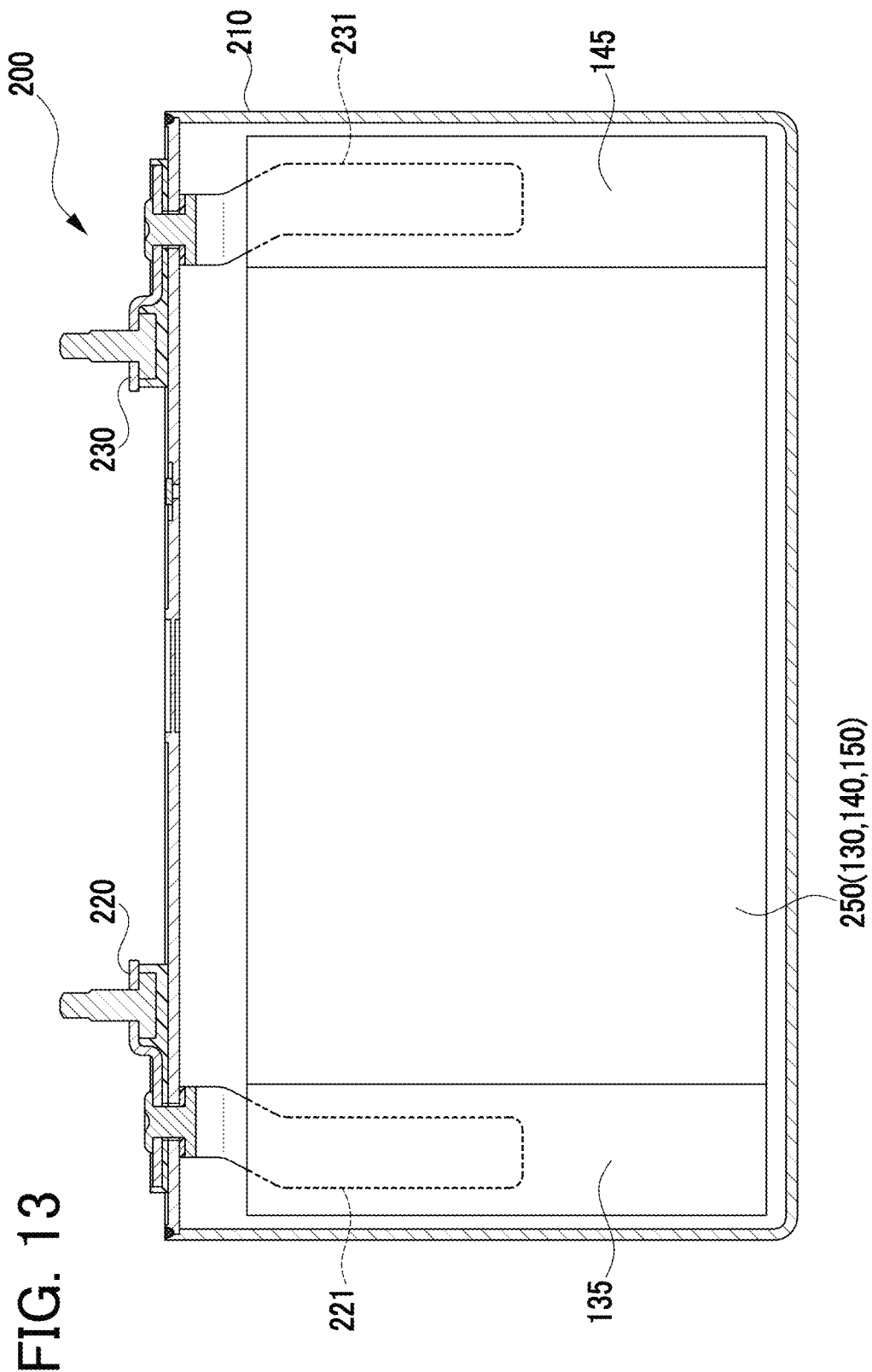
FIG. 13 is a sectional schematic view of the power storage device in the embodiment.

Subsequently, the process proceeds to step S8 (an electrode body producing step), and an electrode body 250 is produced by winding (or laminating) the electrode plate 130 (for example, a positive electrode plate), an other electrode plate 140 (for example, a negative electrode plate), and a separator 150 (see FIG. 13). Thereafter, in step S9 (an assembling step), the mixture non-laminated portion 135 of the electrode plate 130 configuring the electrode body 250 is bonded to a connection part 221 of a first electrode terminal 220 (for example, a positive electrode terminal) and a mixture non-laminated portion 145 of the electrode plate 140 is bonded to a connection part 231 of a second electrode terminal 230 (for example, a negative electrode terminal). After that, the electrode body 250 and an electrolyte (not shown) are accommodated in a battery case 210 to produce the lithium-ion secondary battery 200 (see FIG. 13).

Figure 16:
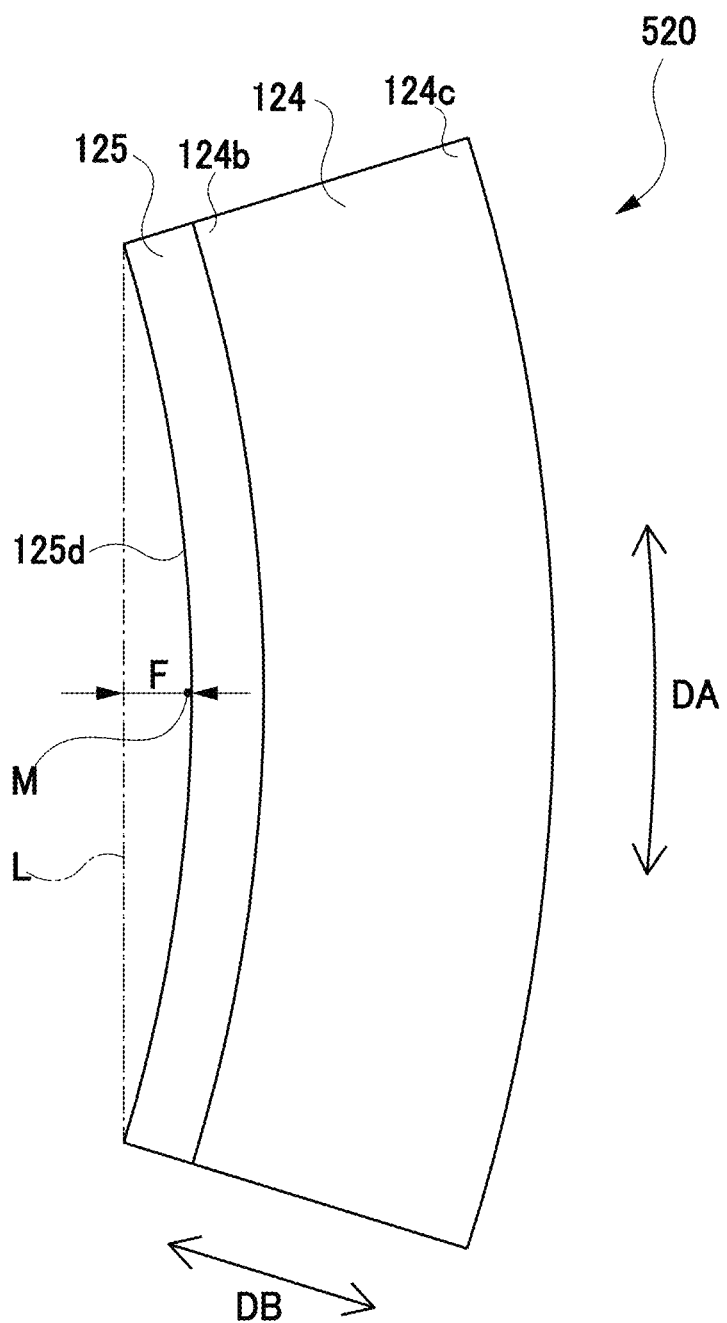
FIG. 16 is an explanatory view for explaining a widthwise curve of a conventional strip-shaped electrode plate.

In the strip-shaped electrode plate 120 formed by cutting the wide strip-shaped electrode plate 110 in the cutting step (step S4), the mixture laminated portion 124 is configured such that the cut-plane-side section 124c is thick and the mixture non-laminated-portion-side section 124b is thin (see FIG. 5). When the electrode rolls 180 and 190 formed by winding up the thus configured strip-shaped electrode plates 120 in a roll-like shape are stored in the storing step (step S6), the electrode rolls 180 and 190 are stored in a state in which the cut-plane-side section 124c of the mixture laminated portion 124 having the thick thickness is applied with relatively strong tensile force, so that the cut-plane-side section 124c of the mixture laminated portion 124 is stretched during storage. Accordingly, in a conventional producing method, the mixture non-laminated-portion-side section 124b becomes relatively short in the mixture laminated portion 124 and the gap generated between a length of the cut-plane-side section 124c and a length of the mixture non-laminated-portion-side section 124b of the mixture laminated portion 124 caused the curve in the widthwise direction DB in a strip-shaped electrode plate 520 (see FIG. 16) that has been through the storing step (step S6).

On the other hand, in the laminated-portion stretching step (step S3) prior to the cutting step (step S4) of the present embodiment, the pair of the mixture non-laminated-portion-side sections 114b located on the sides (both outer sides in the widthwise direction DB) of the mixture non-laminated portion 115 of the mixture laminated portion 114 of the wide strip-shaped electrode plate 110 is stretched in the longitudinal direction DA. In this manner, of the mixture laminated portion 114, the mixture non-laminated-portion-side section 114b which is to be the mixture non-laminated-portion-side section 124b after the cutting step is stretched in advance in the longitudinal direction DA in addition to the cut-plane-side section 124c that is to be stretched in the longitudinal direction DA in the later storing step (step S6) so that the strip-shaped electrode plate 120 after storage can have the smaller gap in the length of the cut-plane-side section 124c and the mixture non-laminated-portion-side section 124b. Accordingly, the strip-shaped electrode plate 120 having been through the storing step can reduce the curve in the widthwise direction DB. Moreover, in the present embodiment, the electrode plate 130 can be formed from the strip-shaped electrode plate 120 having less curve in the widthwise direction DB, and thus the electrode plate 130 can be produced appropriately in the electrode plate producing step (step S7).

Further, as mentioned above, when the electrode rolls 180 and 190 are stored in the storing step, the cut-plane-side section 124c of the mixture laminated portion 124 is stretched in the longitudinal direction DA, and a stretched amount in a portion located on an outer circumferential side becomes larger than a stretched amount on an inner circumferential side of each of the electrode rolls 180 and 190. This is because each of the outer circumferential sides of the electrode rolls 180 and 190 has a larger outer diameter gap (ra-rb) between the cut-plane-side section 124c and the mixture non-laminated-portion-side section 124b that is caused by the thickness gap between the cut-plane-side section 124c and the mixture non-laminated-portion-side section 124b of the mixture laminated portion 124 (see FIG. 11), and thereby the larger tensile force is applied to the cut-plane-side section 124c on the outer circumferential side of the electrode rolls 180 and 190.

To address this, in the laminated-portion stretching step of the present embodiment, the pair of the mixture non-laminated-portion-side sections 114b are stretched in the longitudinal direction DA such that the stretched amount in the portion of the mixture non-laminated-portion-side section 114b of the mixture laminated portion 114 to be located on the outer circumferential side of the electrode rolls 180 and 190 becomes larger than the portion to be located on the inner circumferential side, which are to be formed in the later winding-up step. Specifically, the pair of the mixture non-laminated-portion-side sections 114b are stretched in the longitudinal direction DA in the laminated-portion stretching step such that the stretched amount of a longitudinal rear-end portion of the mixture non-laminated-portion-side section 114b to be stretched later becomes longer than a stretched amount of a longitudinal leading-end portion to be stretched earlier in the laminated-portion stretching step.

To be more specific, on condition that the tensile force applied to the mixture non-laminated-portion-side section 114b of the mixture laminated portion 114 is made to be larger in the portion to be located on the outer circumferential side than in the portion to be located on the inner circumferential side of the respective electrode rolls 180 and 190 in the laminated-portion stretching step, the mixture non-laminated-portion-side section 114b is stretched. In other words, the tensile force applied to the mixture non-laminated-portion-side section 114b is made to be increased as the length of the mixture non-laminated-portion-side section 114b of the wide strip-shaped electrode plate 110 which has been performed with the laminated-portion stretching step becomes longer, or namely, as a wind-up length of the strip-shaped electrode plates 120 wound up by the first wind-up section 80 and the second wind-up section 90 becomes longer.

As mentioned above, the stretched amount of the mixture non-laminated-portion-side section 114b in the laminated-portion stretching step is made to become larger in the portion to be located on the outer circumferential side of the respective electrode rolls 180 and 190 than in the portion to be located on the inner circumferential side as similar to the cut-plane-side section 124c after storage. This can achieve reduction in the stretch gap between the cut-plane-side section 124c and the mixture non-laminated-portion-side section 124b after storage over the entire longitudinal direction DA, thus further reducing the curve in the widthwise direction DB of the strip-shaped electrode plate 120 after storage.

Further, in the non-laminated-portion stretching step of the present embodiment, the pair of the mixture non-laminated portions 115 are stretched in the longitudinal direction DA such that the stretched amount becomes larger in the portion of the mixture non-laminated portion 115 to be located on the outer circumferential side than in the portion to be located on the inner circumferential side of the electrode rolls 180 and 190. Specifically, the mixture non-laminated portion 115 is stretched in the non-laminated-portion stretching step such that the tensile force applied to the mixture non-laminated portion 115 becomes larger in the portion to be located on the outer circumferential side than in the portion to be located on the inner circumferential side of the respective electrode rolls 180 and 190. In other words, the tensile force applied to the mixture non-laminated portion 115 is made to be increased as the length of the mixture non-laminated portion 115 of the wide strip-shaped electrode plate 110 that has been performed with the non-laminated-portion stretching step becomes longer, or namely, as the wind-up length of the strip-shaped electrode plate 120 wound up by the respective first wind-up section 80 and the second wind-up section 90 becomes longer.

As mentioned above, the stretched amount of the mixture non-laminated portion 115 in the non-laminated-portion stretching step is arranged in a manner that the stretched amount is made to be larger in the portion to be located on the outer circumferential side than in the portion to be located on the inner circumferential side of the electrode rolls 180 and 190 as similar to the cut-plane-side section 124c of the mixture laminated portion 124 after storage, so that the stretch gap between the mixture non-laminated portion 125 and the cut-plane-side section 124c after storage can be made small over the entire longitudinal direction DA. This leads to further reduction in the curve in the widthwise direction DB of the strip-shaped electrode plate 120 after storage.

Herein, in the present embodiment, as the length of the mixture non-laminated-portion-side section 114b of the wide strip-shaped electrode plate 110 that has been performed with the laminated-portion stretching step becomes longer, or namely, as the wind-up length of the strip-shaped electrode plates 120 which are wound up by the first wind-up section 80 and the second wind-up section 90 becomes longer, a not-shown air cylinder is driven such that the dancer roll 51 is to be moved to a left side in FIG. 1 in order to increase the tensile force applied to the portion of the wide strip-shaped electrode plate 110 located between the press rolls 21, 22 and the nip rolls 61, 62. At this time, the tensile force applied to the wide strip-shaped electrode plate 110 is varied between the press rolls 21, 22 and the nip rolls 61, 62 by carrying out speed control of a feeding speed of the wide strip-shaped electrode plate 110, so that the dancer roll 51 is actually made not to move. This leads to increase in the tensile force applied to the mixture non-laminated-portion-side section 114b in the laminated-portion stretching step and increase in the tensile force applied to the mixture non-laminated portion 115 in the non-laminated-portion stretching step.

Figure 10:
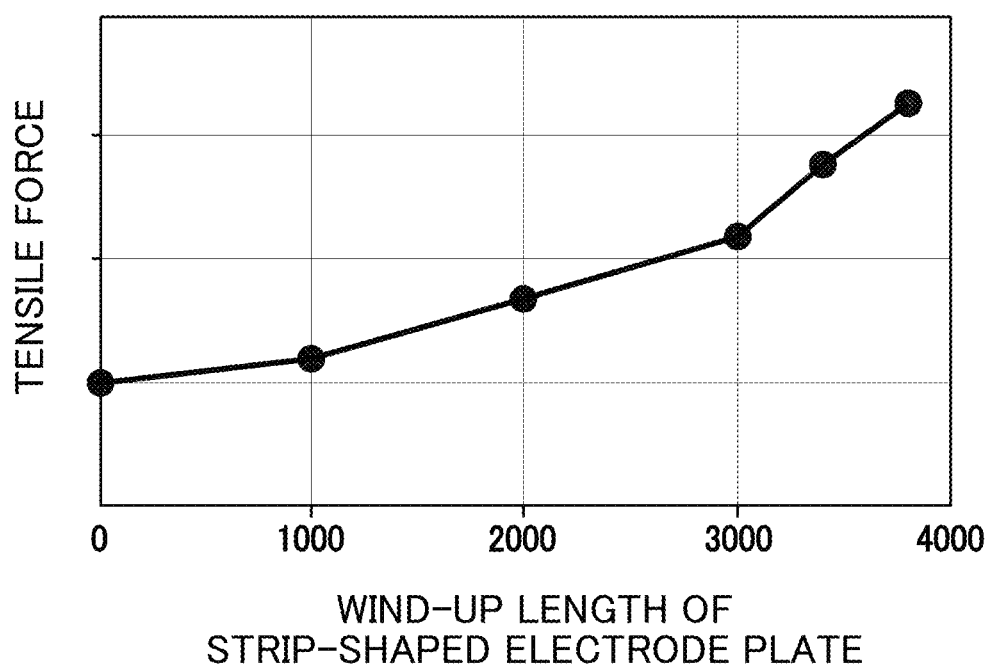
FIG. 10 is a view showing a relation between a wind-up length of the strip-shaped electrode plate and a tensile force in the embodiment.
Figure 17:
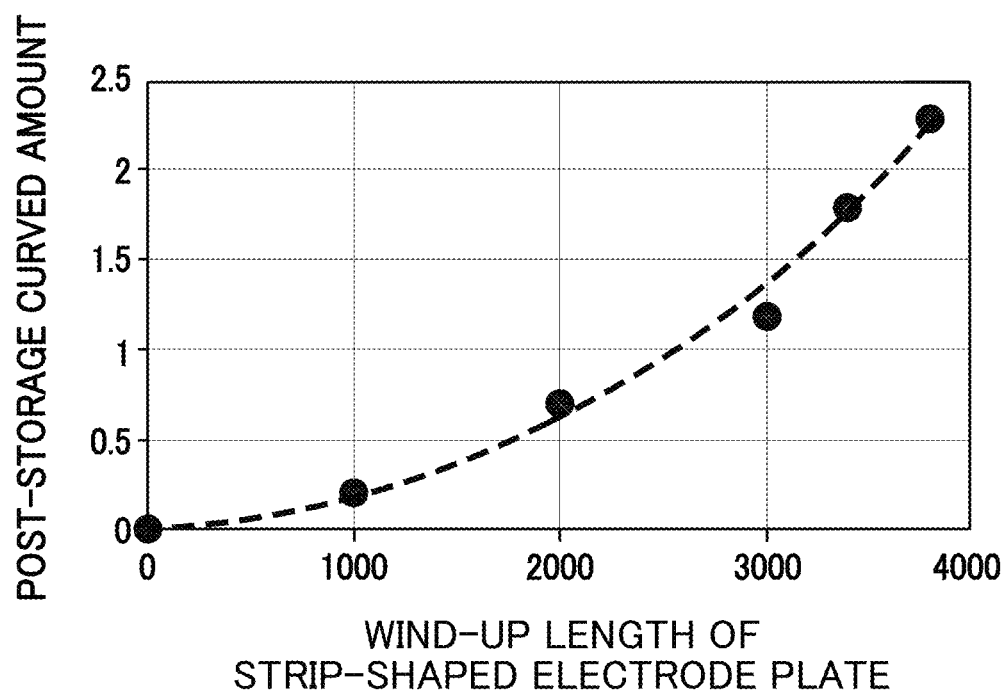
FIG. 17 is a view showing a relation of a wind-up length and a widthwise curved amount of the conventional strip-shaped electrode plate.

Furthermore, in the present embodiment, the tensile force is varied in a way of satisfying a relation indicated in FIG. 10. The data indicated in FIG. 10 is obtained by a relation of a wind-up length of the strip-shaped electrode plate 520 that has been produced by a conventional producing method and a curved amount F in the widthwise direction DB after storage (see FIG. 17). The curved amount F in the widthwise direction DB is a minimum distance of a line L linking both ends of a side 125d of the mixture non-laminated portion 125 and a center position M (namely, a point of 1 meter from one end of the strip-shaped electrode plate 520) in the longitudinal direction DA of the side 125d in the strip-shaped electrode plate 520 having a length of 2 meters (see FIG. 16).

Modified Embodiment

Figure 14:
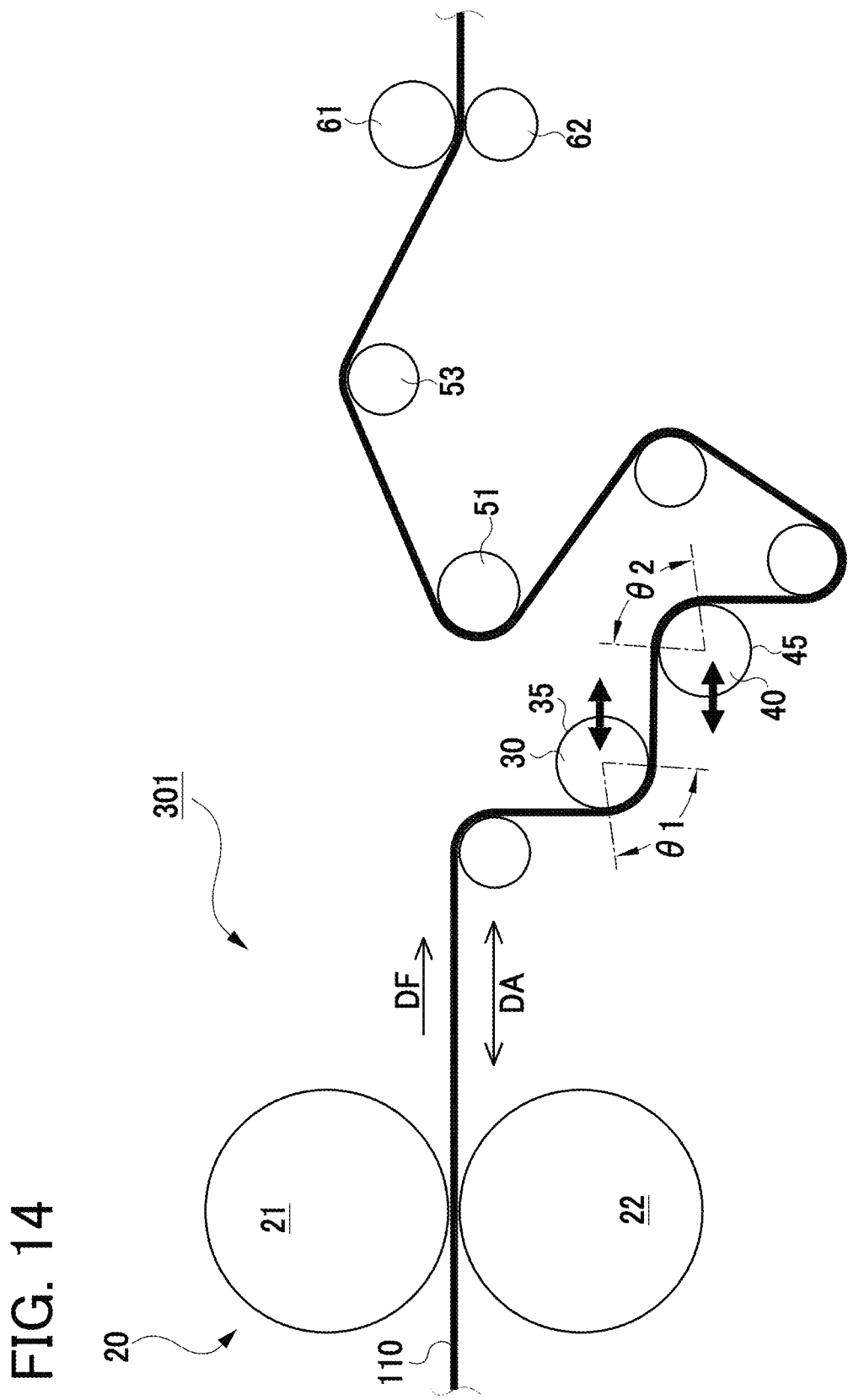
FIG. 14 is a schematic view of a producing apparatus of a strip-shaped electrode plate in a modified embodiment.
Figure 15:
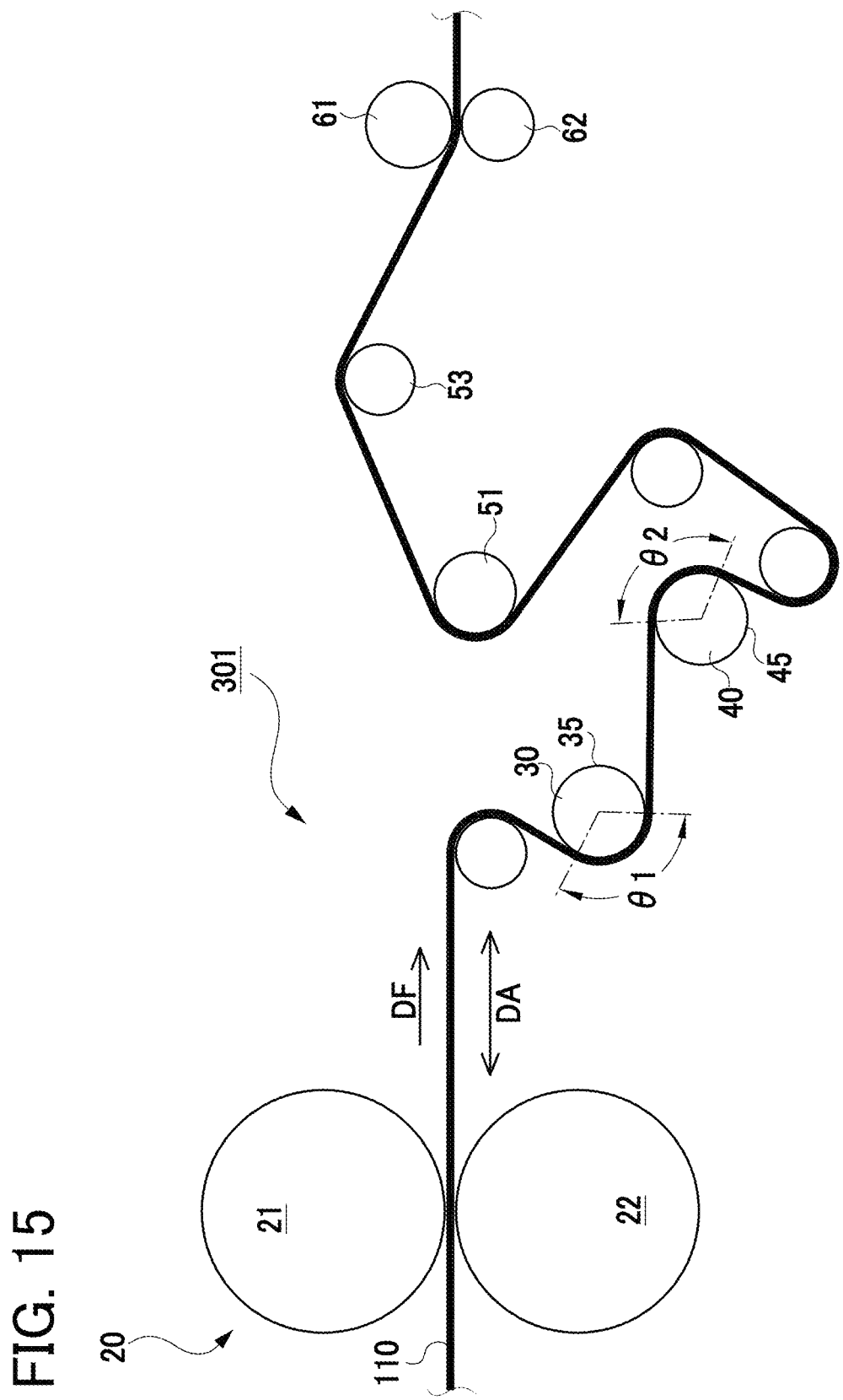
FIG. 15 is another schematic view of the producing apparatus.

FIG. 14 and FIG. 15 show schematic views of a part of the producing apparatus 301 in a modified embodiment. FIG. 14 is a view showing a state of the producing apparatus 301 at the time of starting producing the strip-shaped electrode plate 120, and FIG. 15 is a view showing a state of the producing apparatus 301 at the time directly before termination of producing the strip-shaped electrode plate 120. A not-shown servomotor is driven to move the first stretching roll 30 in a left and right direction in FIG. 14 and FIG. 15. Another not-shown servomotor is driven to move the second stretching roll 40 in the left and right direction in FIG. 14 and FIG. 15. In the modified embodiment, as producing of the strip-shaped electrode plate 120 proceeds, namely, as a wind-up length of the respective strip-shaped electrode plates 120 which are wound up by the first wind-up section 80 and the second wind-up section 90 become longer, the first stretching roll 30 and the second stretching roll 40 are moved from positions indicated in FIG. 14 to left sides. Herein, in the present modified embodiment, the dancer roll 51 is moved from the position indicated in FIG. 14 to the left side as well as the first stretching roll 30 and the second stretching roll 40 so that the tensile force applied to the wide strip-shaped electrode place 110 in a portion located between the press rolls 21, 22 and the nip rolls 61, 62 is made to be constant.

As mentioned above, in the laminated-portion stretching step of the present modified embodiment, the apparatus does not change the tensile force applied to the mixture non-laminated-portion-side section 114b but arranges a wrap angle θ2 of the mixture non-laminated-portion-side section 114b with respect to the major diameter portion 45 to be larger in a portion to be located on an outer circumferential side than in a portion to be located on an inner circumferential side in the electrode rolls 180 and 190 to stretch the mixture non-laminated-portion-side section 114b (see FIG. 14 and FIG. 15). Thus, in the laminated-portion stretching step, the pair of the mixture non-laminated-portion-side sections 114b can be stretched in the longitudinal direction DA such that the stretched amount in the portion to be located on the outer circumferential side of the respective electrode rolls 180 and 190 is made to be larger than the stretched amount in the portion to be located on the inner circumferential side of the respective electrode rolls 180 and 190 in the mixture non-laminated-portion-side section 114b of the mixture laminated portion 114.

Further, also in the non-laminated-portion stretching step, the apparatus does not change the tensile force applied to the mixture non-laminated portion 115 but arranges a wrap angle θ1 of the mixture non-laminated portion 115 with respect to the first major diameter portion 35 to be larger in the portion to be located on the outer circumferential side than in the portion to be located on the inner circumferential side of the electrode rolls 180 and 190 to stretch the mixture non-laminated-portion-side section 114b (see FIG. 14 and FIG. 15). Accordingly, in the non-laminated-portion stretching step, the pair of the mixture non-laminated portions 115 can be stretched in the longitudinal direction DA such that the stretched amount becomes larger in the portion to be located on the outer circumferential side than in the portion to be located on the inner circumferential side of the electrode rolls 180 and 190 in the mixture non-laminated portion 115.

As above, the present disclosure has been explained by the embodiment and the modified embodiment, but the present disclosure is not limited to the above-mentioned embodiment and others and may be adopted with any appropriate modifications without departing from the scope of the disclosure. For example, in the embodiment and others, three steps of the roll pressing step, the non-laminated-portion stretching step, and the laminated-portion stretching step are performed in this order. Alternatively, these steps may be performed in any order. However, it is preferable to perform the roll pressing step first. Further alternatively, the non-laminated-portion stretching step and the laminated-portion stretching step may be performed simultaneously. Namely, the mixture non-laminated portion 115 and the mixture non-laminated-portion-side sections 114b of the mixture laminated portion 114 may be stretched at the same time.

REFERENCE SIGNS LIST 21, 22 Press roll
30 First stretching roll
40 Second stretching roll
110 Wide strip-shaped electrode plate
111, 121, 131 Current collecting foil
112, 122, 132 Electrode mixture layer
114, 124, 134 Mixture laminated portion
114b, 124b Mixture non-laminated-portion-side section
115, 125, 135 Mixture non-laminated portion
120 Strip-shaped electrode plate
130 Electrode plate
180, 190 Electrode roll

What is claimed is:

1. A method of producing a power storage device, comprising:
   roll pressing a mixture laminated portion of a wide strip-shaped electrode plate which includes the mixture laminated portion, the mixture laminated portion having a strip shape in which an electrode mixture layer is laminated on a surface of a strip-shaped current collecting foil extending in a longitudinal direction and a pair of mixture non-laminated portions of the current collecting foil in which no electrode mixture layer is laminated, the mixture non-laminated portions extending in the longitudinal direction on opposite sides of the mixture laminated portion in a width direction orthogonal to the longitudinal direction,
   stretching the pair of the mixture non-laminated portions of the wide strip-shaped electrode plate in the longitudinal direction, and
   stretching a pair of mixture non-laminated-portion-side sections of the mixture laminated portion on opposite sides of each of the pair of the mixture non-laminated portions with respect to a center portion of the mixture laminated portion in the width direction, wherein the center portion of the mixture laminated portion is not stretched during the stretching of the pair of mixture non-laminated-portion-side sections,
   cutting the wide strip-shaped electrode plate, which has been finished with the roll pressing, the stretching of the pair of the mixture non-laminated-portions, and the stretching of the pair of mixture non-laminated-portion-side sections, in the longitudinal direction at a center in the width direction to divide the wide strip-shaped electrode plate into two strip-shaped electrode plates,
   winding up each of the two strip-shaped electrode plates in a roll shape around a winding core by applying a tensile force in the longitudinal direction to form two electrode rolls,
   storing each of the two electrode rolls, and
   cutting the strip-shaped electrode plates configuring the electrode rolls, after the storing, by a predetermined length to produce a plurality of electrode plates.

2. The method of producing the power storage device according to claim 1, wherein stretching the pair of the mixture non-laminated-portion-side sections comprises stretching the pair of mixture non-laminated-portion-side sections in the longitudinal direction such that a stretched amount of a portion of each mixture non-laminated-portion-side section of the mixture laminated portion to be located on an outer circumferential side of the respective electrode roll is larger than a stretched amount of a portion of the respective mixture non-laminated-portion-side section to be located on an inner circumferential side of the respective electrode roll.

3. The method of producing the power storage device according to claim 2, wherein stretching the pair of the mixture non-laminated portions comprises stretching the pair of mixture non-laminated portions in the longitudinal direction such that a stretched amount of a respective portion of each mixture non-laminated portion to be located on an outer circumferential side of the respective electrode roll is larger than a stretched amount of a portion of the respective mixture non-laminated portion to be located on an inner circumferential side of the respective electrode roll.

4. The method of producing the power storage device according to claim 1, wherein stretching the pair of the mixture non-laminated portions comprises stretching the pair of mixture non-laminated portions in the longitudinal direction such that a stretched amount of a respective portion of each mixture non-laminated portion to be located on an outer circumferential side of the respective electrode roll is larger than a stretched amount of a portion of the respective mixture non-laminated portion to be located on an inner circumferential side of the respective electrode roll.

* * * * *